(12) United States Patent
Kwak

(10) Patent No.: US 11,044,036 B2
(45) Date of Patent: Jun. 22, 2021

(54) DEVICE AND METHOD FOR PERFORMING DATA COMMUNICATION WITH SLAVE DEVICE

(71) Applicant: SAMSUNG ELECTRONICS CO., LTD., Suwon-si (KR)

(72) Inventor: Kuen-Hwan Kwak, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/631,622

(22) PCT Filed: Jul. 5, 2018

(86) PCT No.: PCT/KR2018/007604
§ 371 (c)(1),
(2) Date: Jan. 16, 2020

(87) PCT Pub. No.: WO2019/050142
PCT Pub. Date: Mar. 14, 2019

(65) Prior Publication Data
US 2020/0177301 A1 Jun. 4, 2020

(30) Foreign Application Priority Data

Sep. 5, 2017 (KR) .......................... 10-2017-0113347

(51) Int. Cl.
*H04L 1/00* (2006.01)
*H04W 4/80* (2018.01)
(Continued)

(52) U.S. Cl.
CPC .......... *H04L 1/0002* (2013.01); *H04L 67/125* (2013.01); *H04W 4/80* (2018.02); *H04W 12/06* (2013.01)

(58) Field of Classification Search
CPC ...... H04L 1/0002; H04L 67/125; H04W 4/80; H04W 12/06
See application file for complete search history.

(56) References Cited

U.S. PATENT DOCUMENTS 7,424,526 B1 * 9/2008 Hansen ............... H04L 12/2856
370/232
8,560,734 B2 10/2013 Miller et al.
(Continued)

FOREIGN PATENT DOCUMENTS

KR 10-2015-0060790 6/2015
KR 10-2017-0058629 5/2017

OTHER PUBLICATIONS

International Search Report dated Oct. 15, 2018 for PCT/KR2018/007604 and English-language translation.
(Continued)

*Primary Examiner* — Henry Tsai
*Assistant Examiner* — John B Roche
(74) *Attorney, Agent, or Firm* — Nixon & Vanderhye, P.C.

(57) ABSTRACT

A device for communicating with a slave device includes a communication module; a memory; and at least one processor configured to control the communication module and the memory, wherein the memory stores instructions configured, when the device operates, for the at least one processor to acquire a device identifier (ID) of the slave device, acquire a first data transmission rate for data communication with the slave device based on the acquired device ID and a first time period corresponding to a current time, and communicate with the slave device based on the acquired first data transmission rate, and the first data transmission rate acquired by the processor is substantially the same as a first data transmission rate calculated by the slave device based on the first time period.

13 Claims, 9 Drawing Sheets

(51) Int. Cl.
  *H04L 29/08* (2006.01)
  *H04W 12/06* (2021.01)

(56) References Cited

U.S. PATENT DOCUMENTS

| | | |
|---|---|---|
| 9,591,679 B2 | 3/2017 | Bontu et al. |
| 2006/0059336 A1 | 3/2006 | Miller et al. |
| 2011/0194568 A1* | 8/2011 | Ozawa ................ H04L 65/4084 370/465 |
| 2012/0246276 A1* | 9/2012 | Matsubara ............ H04L 47/762 709/219 |
| 2012/0307702 A1 | 12/2012 | Nakae et al. |
| 2015/0188691 A1 | 7/2015 | Mizuguchi |
| 2016/0188509 A1* | 6/2016 | Lin ....................... G06F 13/362 710/110 |

OTHER PUBLICATIONS

Written Opinion dated Oct. 15, 2018 for PCT/KR2018/007604 and English-language translation.
"Welcome to the Exploitee.rs Wiki", https://www.exploitee.rs/, last edited Aug. 5, 2017.
"Hack All The Things: 20 Devices in 45 Minutes", YouTube video, https://www.youtube.com/watch?v=h5PRvBpLuJs, Oct. 2, 2014.

* cited by examiner

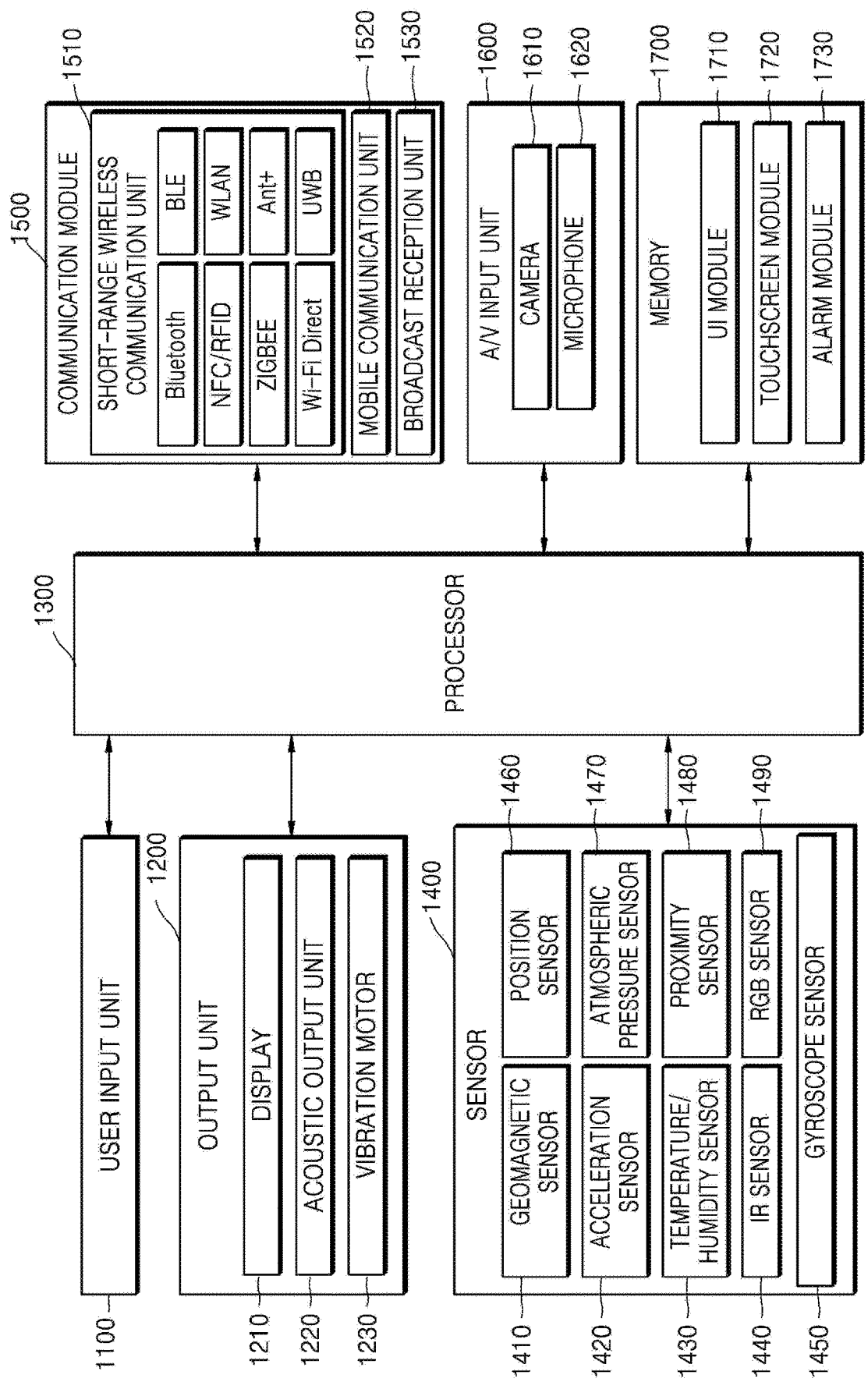

ary; and at least one processor configured to control the communication module and the memory, wherein the memory stores instructions configured, when the device operates, for the at least one processor to acquire a device identifier (ID) of a slave device, acquire a first data transmission rate for data communication with the slave device based on the acquired device ID and a first time period corresponding to a current time, and communicate with the slave device based on the acquired first data transmission rate, and the first data transmission rate acquired by the processor is substantially the same as a first data transmission rate calculated by the slave device based on the first time period.

The memory may store instructions further configured, when the device operates, for the at least one processor to request the first data transmission rate from a server for managing criterion information about a criterion of calculating the first data transmission rate and receive the first data transmission rate from the server, and the criterion information about a criterion of calculating the first data transmission rate may be shared between the slave device and the server.

The memory may store instructions further configured, when the device operates, for the at least one processor to provide the device ID of the slave device to the server to receive the first data transmission rate from the server.

According to a second aspect of the present disclosure, there is provided a method including: acquiring a device identifier (ID) of the slave device; acquiring a first data transmission rate for data communication with the slave device based on the acquired device ID and a first time period corresponding to a current time; and communicating with the slave device based on the acquired first data transmission rate, wherein the acquired first data transmission rate is substantially the same as a first data transmission rate calculated by the slave device based on the first time period.

According to a third aspect of the present disclosure, there is provided a computer program product including a computer-readable recording medium including instructions, performed by a master device, including: acquiring a device identifier (ID) of the slave device; acquiring a first data transmission rate for data communication with the slave device based on the acquired device ID and a first time period corresponding to a current time; and communicating with the slave device based on the acquired first data transmission rate, wherein the acquired first data transmission rate is substantially the same as a first data transmission rate calculated by the slave device based on the first time period.

DEVICE AND METHOD FOR PERFORMING DATA COMMUNICATION WITH SLAVE DEVICE

This application is the U.S. national phase of International Application No. PCT/KR2018/007604 filed 5 Jul. 2018, which designated the U.S. and claims priority to KR Patent Application No. 10-2017-0113347 filed 5 Sep. 2017, the entire contents of each of which are hereby incorporated by reference.

TECHNICAL FIELD

The present disclosure relates to a device and a method for performing data communication with a slave device and, more particularly, to a device and a method for performing data communication with a slave device by changing a data transmission rate at a predetermined time interval.

BACKGROUND ART

Along with the development of electronic communication technology, a user may receive various services by using a device. In particular, currently used devices provide a lot of services closely associated with the life of users. In addition, the devices store even personal information to provide more services to the users, and accordingly, the importance of device security has come to the fore.

However, because much effort for security in a manufacturing process is not made to devices implemented at a low price, these devices are vulnerable to security. In particular, the devices implemented at a low price are commercialized in a state in which a serial communication terminal used in a development process is exposed as it is, and hackers may easily acquire information about the devices through the serial communication terminal by selecting any one of well-known data transmission rates (e.g., bits per second (BPS)). In addition, the devices implemented at a low price usually have the same device identifier (ID) or password assigned for each product model. Therefore, even when a hacker hacks only information about one device through a serial communication terminal, information on the other devices of the same model may also be exposed, and thus, the exposed information may be abused for a crime.

DESCRIPTION OF EMBODIMENTS

Technical Problem

Some embodiments provide a device and a method for acquiring a data transmission rate for data communication with a slave device based on a device identifier (ID) of the slave device and a time period corresponding to a current time and performing the data communication with the slave device based on the acquired data transmission rate.

In addition, some embodiments provide a device and a method for acquiring a data transmission rate for data communication with a slave device at a predetermined time interval based on a device identifier (ID) of the slave device and a time period corresponding to a current time and performing the data communication with the slave device based on the acquired data transmission rate.

Solution to Problem

Figure 5A:
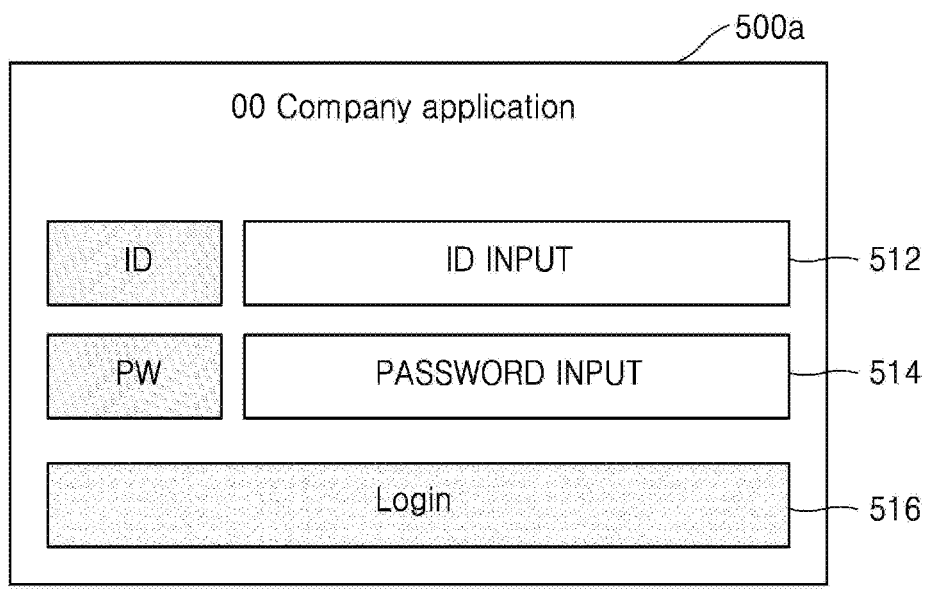
Figure 5B:
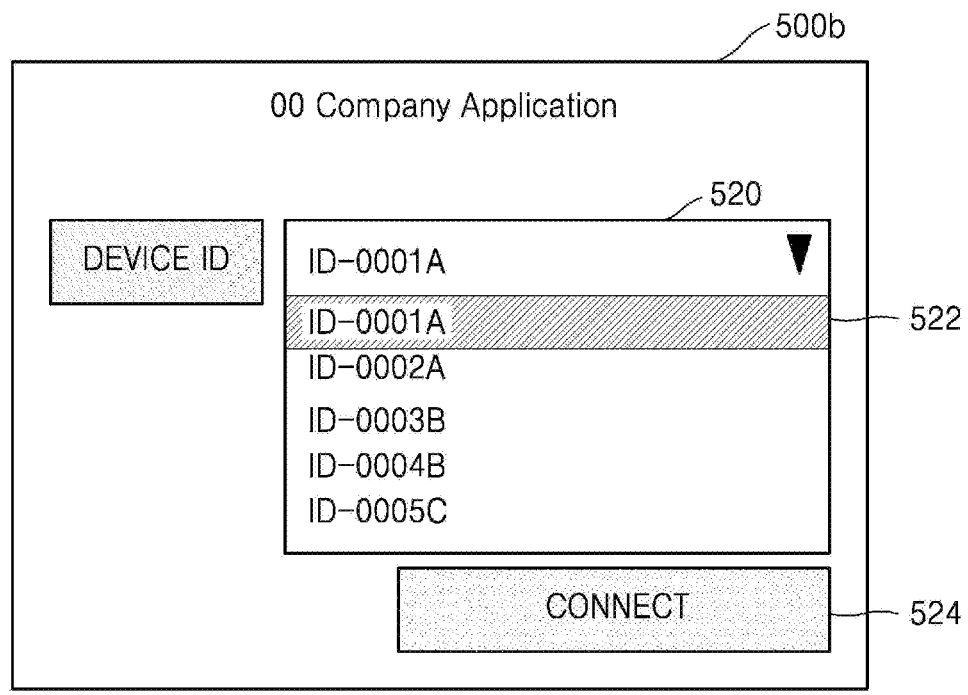
Figure 5C:
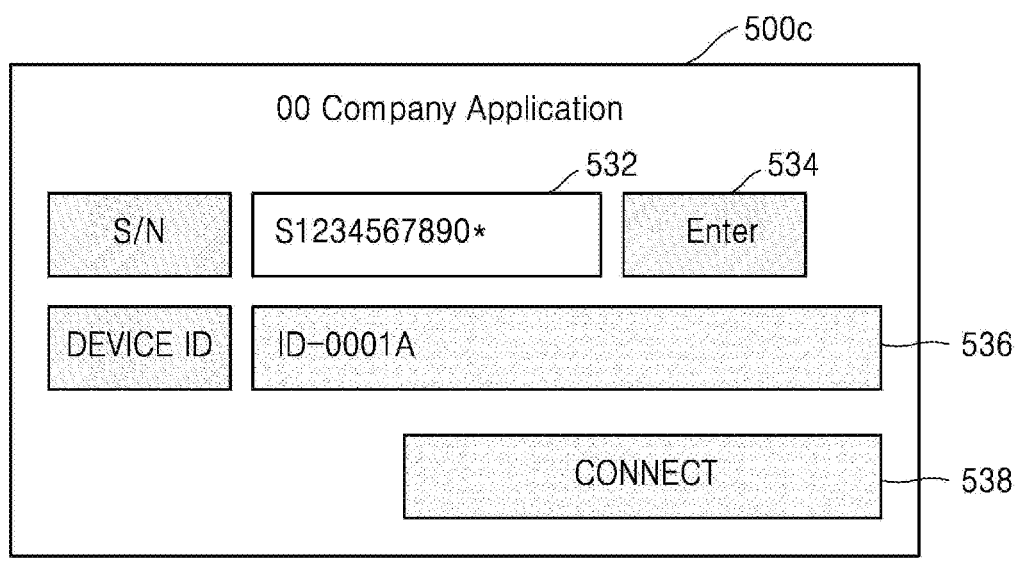

According to a first aspect of the present disclosure, there is provided a device including: a communication module; a FIGS. 5A, 5B, and 5C illustrate an application for calculating a data transmission rate, according to an embodiment.

Figure 6:
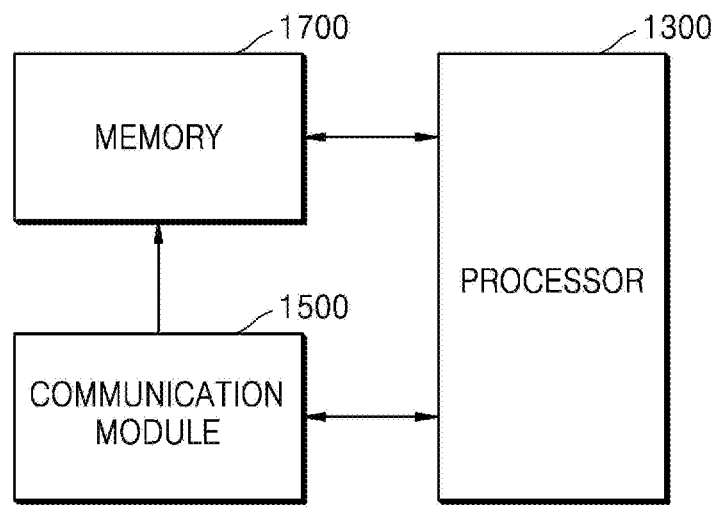

FIG. 6 is a block diagram of the device 100 according to an embodiment.

FIG. 7 is a block diagram of the device 100 according to an embodiment.

MODE OF DISCLOSURE

Hereinafter, embodiments of the present disclosure will be described in detail with reference to the accompanying drawings such that those of ordinary skill in the art to which the present disclosure belongs could easily carry out the embodiments. However, the present disclosure could be implemented in various different forms and is not limited to the embodiments described herein. In addition, in the drawings, parts irrelevant to the description are omitted to clearly describe the present disclosure, and like reference numerals denote like elements throughout the specification.

Throughout the specification, when it is described that a certain part is "connected" to another part, it should be understood that the certain part may be "directly connected" or "electrically connected" to another part via another element in the middle. In addition, when a certain part "includes" a certain component, this indicates that the part may further include another component instead of excluding another component unless there is different disclosure.

The term "the" and similar indication words used in the present specification, and particularly, in the claims may indicate both singular and plural. In addition, if there is no disclosure clearly indicating an order of steps describing a method according to the present disclosure, the disclosed steps may be performed in an appropriate order. The present disclosure is not limited to the disclosure order of the disclosed steps.

Hereinafter, the present disclosure will be described in detail with reference to the accompanying drawings.

Figure 1:
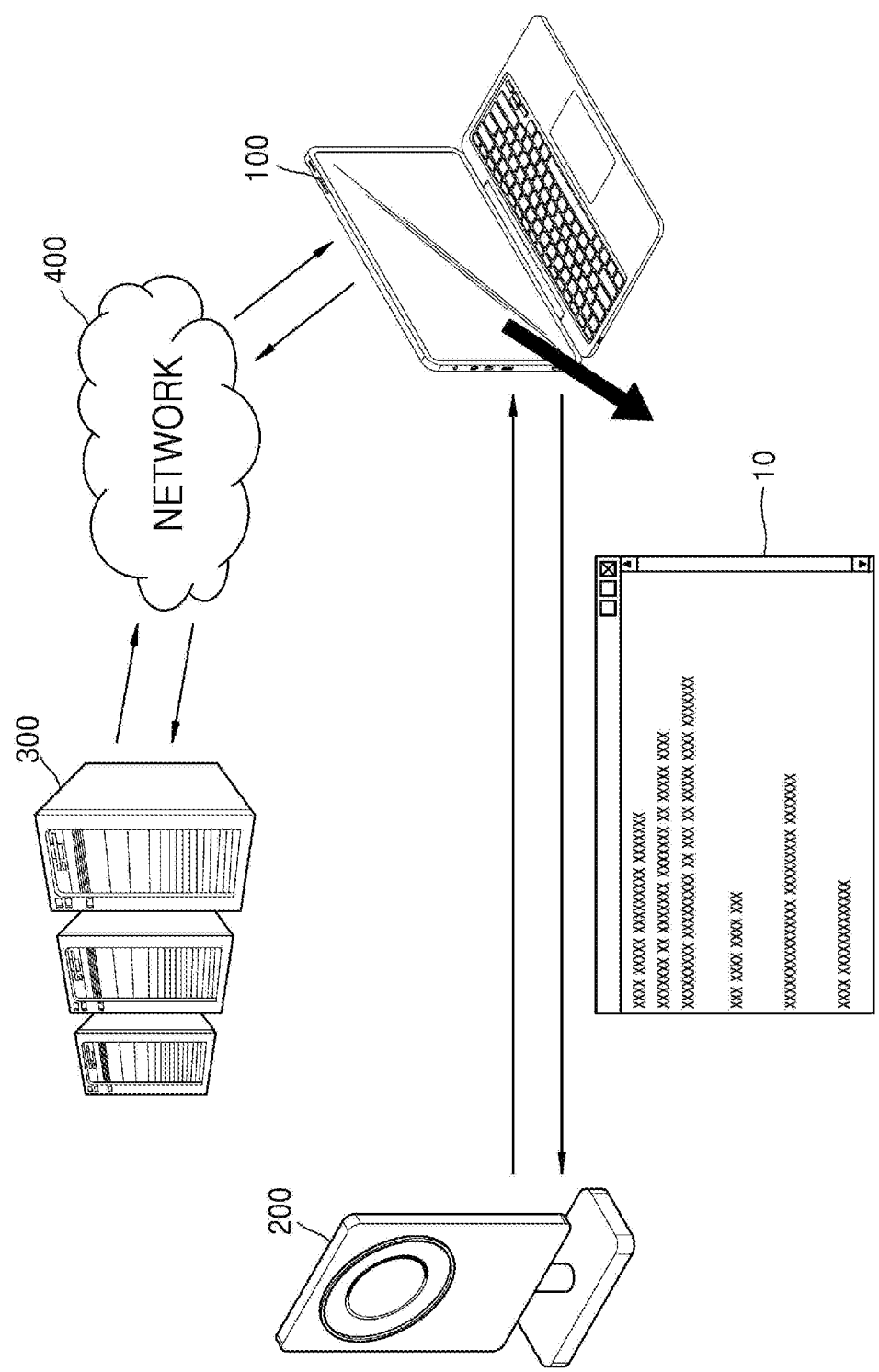
FIG. 1 illustrates communication between a device 100 and a slave device 200, according to an embodiment.

FIG. 1 illustrates communication between a device 100 and a slave device 200, according to an embodiment.

Referring to FIG. 1, the device 100 may perform data communication with the slave device 200. Herein, the communication between the device 100 and the slave device 200 may include serial communication using a universal asynchronous receiver/transmitter (UART) but is not limited thereto.

The device 100 may acquire state information 10 of the slave device 200 through data communication with the slave device 200. Herein, the state information 10 may include software version information, an Internet protocol (IP) address, a device identifier (ID), a password, booting information, and the like of the slave device 200.

According to a disclosed embodiment, the slave device 200 may be a miniature device including a microcontroller, such as a web camera, a wall pad, a doorbell, a Blu-Ray player, or a set-top box, but is not limited thereto.

In addition, according to a disclosed embodiment, the device 100 may be a smartphone, a tablet personal computer (PC), a PC, a smart TV, a cellular phone, a personal digital assistant (PDA), a laptop computer, a micro-server, an e-book terminal, a home appliance, and another mobile or non-mobile computing device capable of communicating with the slave device 200 but is not limited thereto.

The slave device 200 may calculate a data transmission rate based on a time period corresponding to a current time. Alternatively, the slave device 200 may calculate the data transmission rate based on the device ID of the slave device 200 and a time period corresponding to a current time.

Herein, the device ID may be any one of a model name, a product serial number, and a product key of the slave device 200. In addition, the data transmission rate of the slave device 200 may include bits per second (BPS), a character transfer rate, a bit transfer rate, or a block transfer rate of the slave device 200.

Alternatively, the slave device 200 may calculate the data transmission rate based on the device ID of the slave device 200 and a time period corresponding to a current time at a predetermined time interval. The slave device 200 may change the data transmission rate at the predetermined time interval.

The device 100 may acquire the data transmission rate for data communication with the slave device 200.

According to an embodiment, the device 100 may acquire the data transmission rate for data communication with the slave device 200 from a server 300 connected via a network 400. The device 100 may acquire the data transmission rate for data communication with the slave device 200, which has been calculated by the server 300 connected via the network 400. Herein, the network 400 includes a local area network (LAN), a wide area network (WAN), a value added network (VAN), a mobile radio communication network, a satellite communication network, and a combination thereof, is a data communication network of an inclusive meaning, which enables each network configuration entity to smoothly communicate with each other, and may include wired Internet, wireless Internet, and a mobile wireless communication network. Wireless communication may include, for example, wireless LAN (Wi-Fi), Bluetooth, Bluetooth low energy, ZigBee, Wi-Fi Direct (WFD), ultra wideband (UWB), infrared data association (IrDA), near field communication (NFC), and the like but is not limited thereto.

According to another embodiment, the device 100 may receive an application for calculating the data transmission rate for data communication with the slave device 200, from the server 300 connected via the network 400. Herein, the application may calculate a data transmission rate corresponding to the data transmission rate of the slave device 200 based on criterion information about a criterion of calculating the data transmission rate of the slave device 200. Alternatively, the application may calculate the same data transmission rate as a current data transmission rate of the slave device 200.

According to an embodiment, the application may correspond to a specific type of slave device model.

According to another embodiment, the application may be a general-use application corresponding to all types of slave devices.

The device 100 may calculate the data transmission rate for communication with the slave device 200 by using the application received from the server 300.

The server 300 may manage the criterion information about a criterion of calculating the data transmission rate of the slave device 200.

Herein, the criterion information may include at least one of a type of input data needed to calculate the data transmission rate of the slave device 200 and a criterion of determining the input data, a function for calculating a data transmission rate based on the input data, a table indicating a data transmission rate mapped to a value calculated based on the input data, and information about a predetermined time interval for calculating a data transmission rate.

For example, the input data needed to calculate the data transmission rate of the slave device 200 may include the device ID of the slave device 200, and information about a time period corresponding to a current time. In addition, the criterion of determining the input data may include at least one of information about a value corresponding to a device ID, information about a criterion of determining a time period corresponding to a current time, or information about a value corresponding to each of a plurality of divided time periods.

In addition, the server 300 may share, with the slave device 200, the criterion information for calculating the data transmission rate of the slave device 200.

Figure 2:
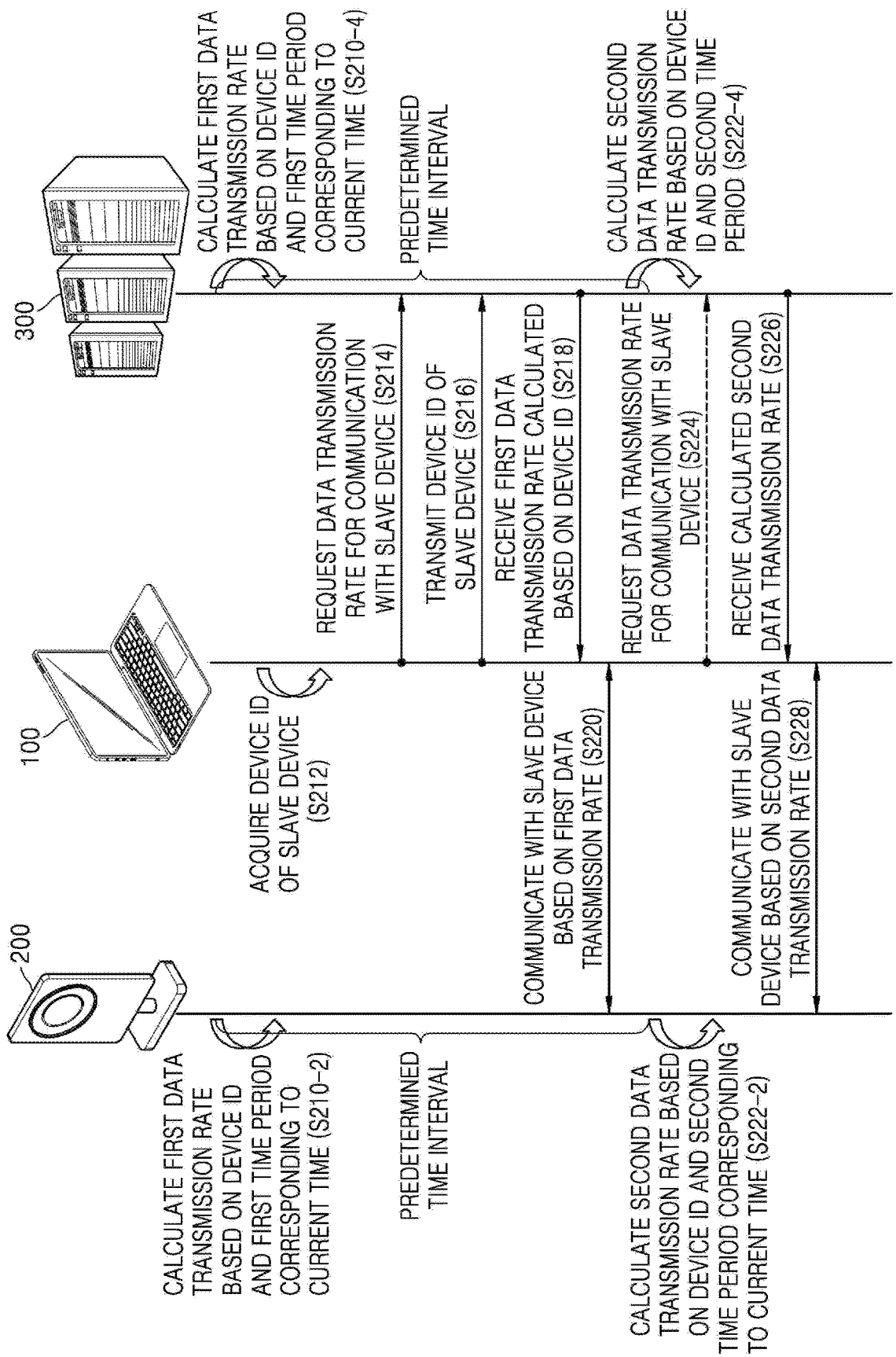
FIG. 2 is a signaling diagram of a method, performed by the device 100, of communicating with the slave device 200 by receiving a data transmission rate from a server 300, according to an embodiment.

FIG. 2 is a signaling diagram of a method, performed by the device 100, of communicating with the slave device 200 by receiving a data transmission rate from the server 300, according to an embodiment.

Referring to FIG. 2, in operation S210-2, the slave device 200 may calculate a first data transmission rate based on the device ID of the slave device 200 and a first time period corresponding to a current time.

The slave device 200 may calculate the first data transmission rate based on the device ID and the first time period corresponding to the current time, based on reference information for calculating a data transmission rate of the slave device 200.

Once power is applied to the slave device 200, the slave device 200 may determine a time period corresponding to a current time at a predetermined time interval and calculate a data transmission rate based on the determined time period.

In addition, when power is applied to the slave device 200 in a power-off state, the slave device 200 may determine a time period corresponding to a current time at which power is applied and calculate a data transmission rate based on the determined time period.

In operation S210-4, the server 300 may calculate a first data transmission rate based on the device ID of the slave device 200 and the first time period corresponding to the current time. The first data transmission rate calculated by the server 300 in operation S210-4 may be the same as the first data transmission rate calculated by the slave device 200 in operation S210-2.

The server 300 may calculate the first data transmission rate based on the device ID and the first time period corresponding to the current time, based on the reference information for calculating the data transmission rate of the slave device 200.

According to an embodiment, operations S210-2 and 210-4 may be performed at the same time. Even without a request from the device 100, the server 300 may calculate the data transmission rate for data communication with the slave device 200, based on the reference information for calculating the data transmission rate of the slave device 200.

Alternatively, according to another embodiment, operations S210-2 and 210-4 may be sequentially performed with a predetermined time difference. In this case, the server 300 may calculate the first data transmission rate based on the device ID of the slave device 200 and the first time period corresponding to the current time only when a request for the data transmission rate for communication with the slave device 200 is received from the device 100 and the device ID is received from the device 100.

In the present disclosure, it is described for convenience of description that the slave device 200 and the server 300 calculate the data transmission rate of the slave device 200 at the same time, but the present disclosure is not limited thereto.

In operation S212, the device 100 may acquire the device ID of the slave device 200.

According to an embodiment, the device 100 may receive an input of the device ID of the slave device 200 from a user through a user input unit.

Alternatively, according to another embodiment, the device 100 may receive the device ID of the slave device 200 from an external device or a database or extract the device ID of the slave device 200 from a memory of the device 100.

In operation S214, the device 100 may request, from the server 300, a data transmission rate for data communication with the slave device 200. The data transmission rate for data communication with the slave device 200 may be the same as the data transmission rate of the slave device 200.

In operation S216, the device 100 may transmit the acquired device ID of the slave device 200 to the server 300.

In operation S218, the device 100 may receive, from the server 300, the first data transmission rate calculated based on the device ID of the slave device 200

According to an embodiment, the device 100 may transmit, to the server 300, user authentication information for receiving the first data transmission rate. The user authentication information may include a user ID, a password, and a public certificate, taken alone or in combination but is not limited thereto. The device 100 may receive, from the server 300, the first data transmission rate calculated based on the device ID of the slave device 200 only when authentication based on the user authentication information is successful.

In operation S220, the device 100 may perform data communication with the slave device 200 based on the first data transmission rate received from the server 300.

The device 100 may perform data communication with the slave device 200 based on the first data transmission rate, which is the same as a current data transmission rate of the slave device 200. The performing of the data communication of the device 100 with the slave device 200 may include performing serial communication of the device 100 with the slave device based on a UART port. The device 100 may receive state information of the slave device 200 by performing data communication with the slave device 200 based on the first data transmission rate, which is the same as the current data transmission rate of the slave device 200.

The device 100 may control a display to display the state information of the slave device 200, which is received from the slave device 200. The state information of the slave device 200 may include, for example, at least one of software version information, an IP address, the device ID, a password, or booting information of the slave device 200. The user may debug an error of the slave device 200 based on the state information of the slave device 200, which is displayed on the display of the device 100.

In operation S222-2, the slave device 200 may calculate a second data transmission rate based on the device ID of the slave device 200 and a second time period corresponding to a current time.

According to an embodiment, the 'current time' in operation S222-2 may be after a predetermined time interval from the 'current time' in operation S210-2. In addition, as another example, the predetermined time interval may indicate a time interval from the 'current time' in operation S210-2 to an end point of the first time period. Alternatively, the predetermined time interval may indicate a time interval from the 'current time' in operation S210-2 to a start point of the second time period. Alternatively, as another example, the predetermined time interval may indicate a time interval from the 'current time' in operation S210-2 to a time at which a time period corresponding to a current time is changed from the first time period to the second time period.

In operation S222-4, the server 300 may calculate a second data transmission rate based on the device ID of the slave device 200 and the second time period corresponding to the current time. The second data transmission rate calculated by the server 300 in operation S222-4 may be the same as the second data transmission rate calculated by the slave device 200 in operation S222-2.

As described above in operation S210-4, the server 300 may calculate a data transmission rate for data transmission with the slave device 200 at the same time as the slave device or sequentially.

In operation S224, the device 100 may request, from the server 300, a data transmission rate for data transmission with the slave device 200 However, operation S224 may be omitted. Even without a request from the device 100, the server 300 may transmit, to the device 100, the second data transmission rate calculated after the predetermined time interval from the calculation of the first data transmission rate.

In operation S226, the device 100 may receive the calculated second data transmission rate from the server 300.

In operation S228, the device 100 may perform data communication with the slave device 200 based on the second data transmission rate received from the server 300.

Figure 3:
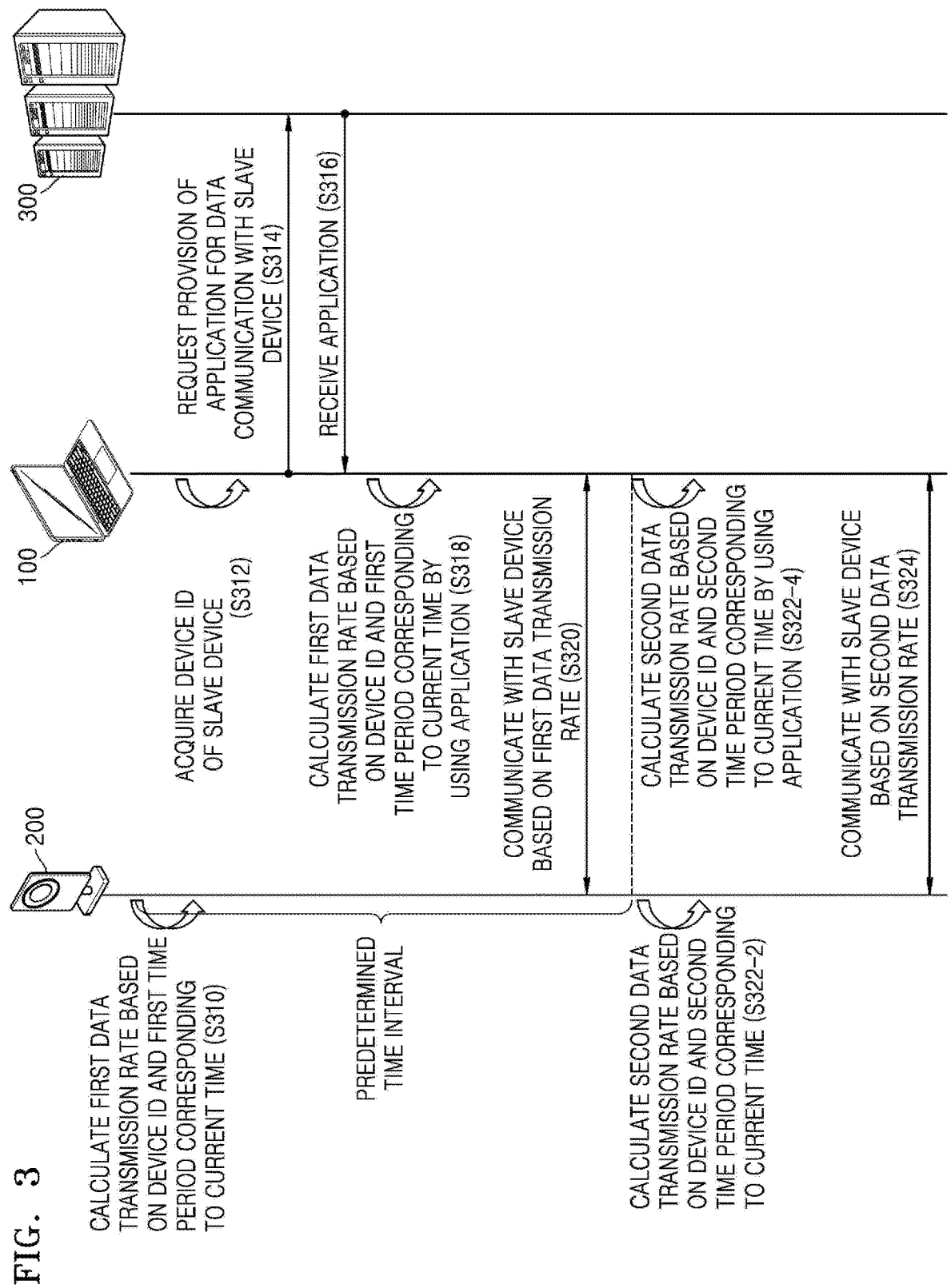
FIG. 3 is a signaling diagram of a method, performed by the device 100, of communicating with the slave device 200 by using an application to calculate a data transmission rate, according to an embodiment.

FIG. 3 is a signaling diagram of a method, performed by the device 100, of communicating with the slave device 200 by using an application to calculate a data transmission rate, according to an embodiment.

Referring to FIG. 3, in operation S310, the slave device 200 may calculate a first data transmission rate based on the device ID of the slave device 200 and a first time period corresponding to a current time. Operation S310 of FIG. 3 may correspond to operation S210-2 shown in FIG. 2, and accordingly, a description thereof is not repeated.

In operation S312, the device may acquire the device ID of the slave device 200. Operation S312 of FIG. 3 may correspond to operation S212 shown in FIG. 2, and accordingly, a description thereof is not repeated.

In operation S314, the device 100 may request the server 300 to provide an application for calculating a data transmission rate for data communication with the slave device 200 (hereinafter, 'application'). Herein, the application may calculate a data transmission rate for communication with the slave device 200 based on criterion information about a criterion of calculating the data transmission rate of the slave device 200. Alternatively, the application may calculate the same data transmission rate as a current data transmission rate of the slave device 200.

According to an embodiment, the application may differ for each slave device model. In this case, the device 100 may provide the device ID of the slave device 200 to the server 300 and request the server 300 to provide an application corresponding to the slave device 200.

In operation S316, the device 100 may receive the application corresponding to the slave device 200 from the server 300.

According to an embodiment, the device 100 may provide, to the server 300, user authentication information for receiving the application. The user authentication information may include at least one of a user ID, a password, or a public certificate. The server 300 may provide the application to the device 100 only when user authentication is successful, based on the user authentication information received from the device 100.

In operation S318, the device 100 may calculate a first data transmission rate based on the device ID of the slave device 200 and the first time period corresponding to the current time by using the application received from the server 300.

According to an embodiment, the device 100 may acquire, through the application, input data needed to calculate a data transmission rate for data communication with the slave device 200. Herein, the input data needed to calculate the data transmission rate for data communication with the slave device 200 may include at least one of user login information and the device ID of the slave device 200.

The device 100 may calculate the data transmission rate for data communication with the slave device 200 by using the application. The device 100 may calculate the first data transmission rate based on the device ID of the slave device 200 and the first time period corresponding to a current time by using the application The first data transmission rate calculated by the device 100 using the application may be the same as the first data transmission rate calculated by the slave device 200 in operation S310.

In operation S320, the device 100 may perform data communication with the slave device 200 based on the calculated first data transmission rate.

The device 100 may perform data communication with the slave device 200 based on the first data transmission rate, which is the same as a current data transmission rate of the slave device 200. The performing of the data communication of the device 100 with the slave device 200 may include performing serial communication of the device 100 with the slave device based on a UART port. The device 100 may receive state information of the slave device 200 by communicating with the slave device 200 based on the first data transmission rate, which is the same as the current data transmission rate of the slave device 200.

The device 100 may control a display to display the state information of the slave device 200, which is received from the slave device 200. The state information of the slave device 200 may include, for example, at least one of software version information, an IP address, the device ID, a password, or booting information of the slave device 200. The user may debug an error of the slave device 200 based on the state information of the slave device 200, which is displayed on the display of the device 100.

In operation S322-2, the slave device 200 may calculate a second data transmission rate based on a slave device ID and a second time period corresponding to a current time.

According to an embodiment, the 'current time' in operation S322-2 may be after a predetermined time interval from the 'current time' in operation S310. In addition, for example, the predetermined time interval may indicate a time interval from the 'current time' in operation S310 to an end point of the first time period. Alternatively, as another example, the predetermined time interval may indicate a time interval from the 'current time' in operation S310 to a start point of the second time period. Alternatively, as another example, the predetermined time interval may indicate a time interval from the 'current time' in operation S210-2 to a time at which a time period corresponding to a current time is changed from the first time period to the second time period.

In operation S322-4, the device 100 may calculate a second data transmission rate based on the device ID of the slave device 200 and the second time period corresponding to the current time by using the application.

According to an embodiment, operations S322-2 and S322-4 may be performed at the same time. The device 100 may calculate the second data transmission rate at the same time as the slave device 200, by using the application.

In operation S324, the device 100 may perform data communication with the slave device 200 based on the calculated second data transmission rate.

According to the disclosed embodiments, it has been described that the device 100 receives the application from the server 300 for managing criterion information about a criterion of calculating a data transmission rate of the slave device 200, but the embodiments are not limited thereto. The device 100 may receive the application for calculating a data transmission rate for data communication with the slave device 200, from an external server or platform for providing various applications.

A slave device according to the related art uses a well-known data transmission rate, such as a data transmission rate determined by dividing a clock count by a predetermined number, and thus, anybody could easily predict the data transmission rate of the slave device. Accordingly, anybody could acquire state information of the slave device by communicating with the slave device at a data transmission rate corresponding to the data transmission rate of the slave device.

However, according to the disclosed embodiments, the slave device 200 may calculate a data transmission rate based on the device ID of the slave device 200 and a time period corresponding to a current time. Because the data transmission rate calculated by the slave device 200 is not a well-known data transmission rate, the security of the slave device 200 may be reinforced. In addition, by receiving a data transmission rate for data communication with the slave device 200 based on predetermined authentication requirements from the server 300 for managing criterion information about a criterion of calculating the data transmission rate of the slave device 200 or calculating a data transmission rate for data communication with the slave device 200 based on an application received from the server 300, data communication with the slave device 200 may be allowed only for a user having authority for the slave device 200.

In addition, according to the disclosed embodiments, the slave device 200 calculates a data transmission rate again based on the device ID and a time period corresponding to a current time after a predetermined time interval. When attempting to perform data communication with the slave device 200, a data transmission rate for performing data communication with the slave device 200 should be changed to correspond to a data transmission rate of the slave device 200, which is changed at the predetermined time interval. Therefore, the security of the slave device 200 may be further reinforced.

Figure 4:
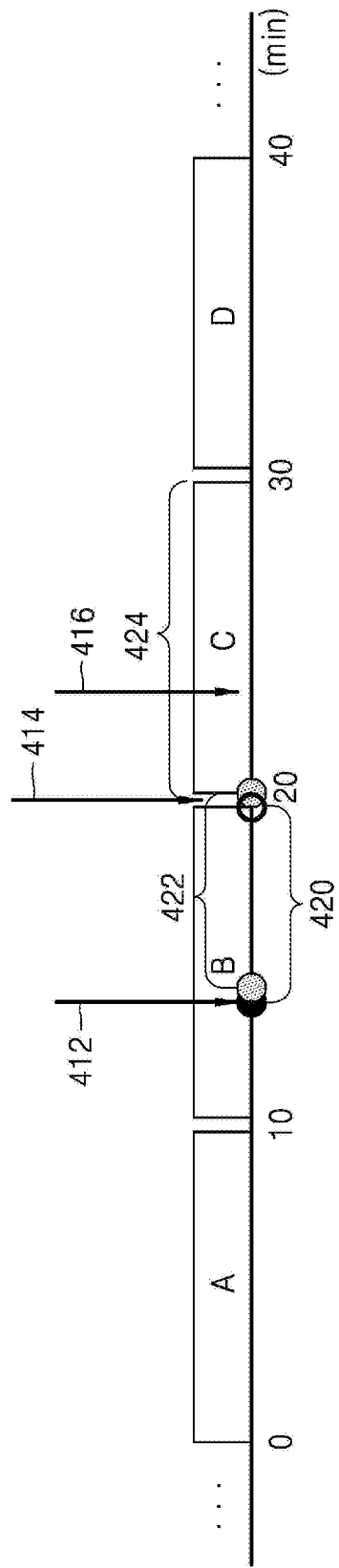
FIG. 4 shows an example of calculating a data transmission rate based on a device identifier (ID) of the slave device 200 and a time period corresponding to a current time, according to an embodiment.

FIG. 4 shows an example of calculating a data transmission rate based on a device ID of the slave device 200 and a time period corresponding to a current time, according to an embodiment.

According to an embodiment, criterion information about a criterion of calculating a data transmission rate of the slave device 200 may include information about a criterion of dividing 24 hours a day by a plurality of time periods.

For example, the criterion information about a criterion of calculating a data transmission rate of the slave device 200 may include dividing 24 hours a day by 144 (24*60/10=144) time periods each being 10 minutes. When different times are included in the same time period, data transmission rates respectively calculated based on the times may be identical.

In more detail with reference to FIG. 4, the criterion information about a criterion of calculating a data transmission rate of the slave device 200 may include information about a criterion of dividing 24 hours a day by a plurality of time periods A, B, C, and D each being 10 minutes. For example, when a first current time 412 is 3 o'clock 14 minutes, a time period corresponding to the first current time 412 may be the time period B. In addition, when a second current time 414 is 3 o'clock 20 minutes, a time period corresponding to the second current time 414 may be the time period C, which is different from the time period corresponding to the first current time 412. In addition, when a third current time 416 is 3 o'clock 24 minutes, a time period corresponding to the third current time 416 may be the time period C, which is the same as the time period corresponding to the second current time.

For example, when a current time is the first current time 412, the slave device 200 may calculate a data transmission rate based on the device ID of the slave device 200 and the time period B corresponding to the first current time 412, based on the criterion information about a criterion of calculating a data transmission rate of the slave device 200. Because the first current time and the second current time are included in different time periods, the data transmission rate calculated at the first current time may differ from a data transmission rate calculated at the second current time.

In addition, the server 300 may calculate a data transmission rate based on the device ID of the slave device 200 and the time period B corresponding to the first current time 412, based on the criterion information about a criterion of calculating a data transmission rate of the slave device 200.

Because the first current time 412 and the second current time 414 are included in different time periods, the data transmission rate calculated at the first current time 412 may differ from the data transmission rate calculated at the second current time 414. However, because the second current time 414 and the third current time 416 are included in the same time period, a data transmission rate calculated at the third current time 416 may be the same as the data transmission rate calculated at the second current time 414.

It has been described with reference to FIG. 4 that 24 hours a day are divided into the plurality of time periods A, B, C, and D each being 10 minutes, but the disclosed embodiments are not limited thereto. According to the disclosed embodiments, the criterion information about a criterion of calculating a data transmission rate of the slave device 200 may include dividing 24 hours a day by a plurality of time periods of various criteria.

According to an embodiment, the criterion information about a criterion of calculating a data transmission rate of the slave device 200 may further include information about a predetermined time interval at which the data transmission rate of the slave device 200 is calculated. The predetermined time interval at which the data transmission rate of the slave device 200 is calculated may indicate a predetermined time interval at which a data transmission rate for data communication with the slave device 200 is calculated.

For example, the predetermined time interval at which the data transmission rate of the slave device 200 is calculated may indicate a time interval from a current time at which the data transmission rate is calculated to an end point of a time period corresponding to the current time at which the data transmission rate is calculated.

Referring to FIG. 4, when a data transmission rate for data communication with the slave device 200 is calculated based on the time period B corresponding to 3 o'clock 14 minutes that is the first current time 412, the predetermined time interval may indicate a time interval 420 from 3 o'clock 14 minutes that is the first current time 412 to an end point of the time period B.

The slave device 200 may calculate a data transmission rate based on the device ID of the slave device 200 and the time period B corresponding to 3 o'clock 14 minutes that is the first current time 412, based on the criterion information about a criterion of calculating a data transmission rate of the slave device 200. In addition, a data transmission rate may be calculated based on the device ID of the slave device 200 and the time period C corresponding to a current time after the time interval 420 from 3 o'clock 14 minutes that is the first current time 412.

Alternatively, as another example, the predetermined time interval at which a data transmission rate for data communication with the slave device 200 is calculated may indicate a time interval from a current time at which the data transmission rate is calculated to a start point at which a time period corresponding to the current time is changed.

Referring to FIG. 4, when a data transmission rate for data communication with the slave device 200 is calculated based on the time period B corresponding to 3 o'clock 14 minutes that is the first current time 412, the predetermined time interval may indicate a time interval 422 from 3 o'clock 14 minutes that is the first current time 412 to a start point at which a time period corresponding to the current time is changed from the time period B to the time period C.

The slave device 200 may calculate a data transmission rate based on the device ID of the slave device 200 and the time period B corresponding to 3 o'clock 14 minutes that is the first current time 412, based on the criterion information about a criterion of calculating a data transmission rate of the slave device 200. In addition, a data transmission rate may be calculated based on the device ID of the slave device 200 and the time period C corresponding to a current time after the time interval 422 from 3 o'clock 14 minutes that is the first current time 412.

Alternatively, as another example, the predetermined time interval at which a data transmission rate for data communication with the slave device 200 is calculated may indicate a time interval from a current time at which the data transmission rate is calculated to a minimum time at which a time period corresponding to the current time is changed to a subsequent time period.

Referring to FIG. 4, when a data transmission rate for data communication with the slave device 200 is calculated based on the time period C corresponding to 3 o'clock 20 minutes that is the second current time 414, the predetermined time interval may indicate a time interval 424 from 3 o'clock 20 minutes that is the second current time 414 to 3 o'clock 30 minutes 0 seconds that is a minimum time at which a time period corresponding to the current time is changed to the time period D that is a subsequent time period of the time period C.

The slave device 200 may calculate a data transmission rate based on the device ID of the slave device 200 and the time period C corresponding to 3 o'clock 20 minutes that is the second current time 414, based on the criterion information about a criterion of calculating a data transmission rate of the slave device 200. In addition, a data transmission rate may be calculated based on the device ID of the slave device 200 and the time period D corresponding to a current time after the time interval 424 from 3 o'clock 20 minutes that is the second current time 414.

FIGS. 5A to 5C illustrate an application for calculating a data transmission rate, according to an embodiment.

FIGS. 5A to 5C show examples of an application provided from the server 300 for managing criterion information about a criterion of calculating a data transmission rate of the slave device 200.

Referring to FIG. 5A, according to an embodiment, an application for calculating a data transmission rate for data communication with the slave device 200 (hereinafter, 'application') may provide a window 500a through which login input information for data transmission rate calculation is received.

The window 500a through which the login input information of the application is received may include a user ID input box 512, a password input box 514, and a login button 516 but is not limited thereto.

According to an embodiment, the application may receive user authentication information for calculating a data transmission rate for data communication with the slave device 200, based on an input received through the window 500a through which login input information is received. The application may calculate a data transmission rate for data communication with the slave device 200 only when user authentication is successful, based on the user authentication information received through the window 500a through which login input information is received.

Referring to FIG. 5B, according to an embodiment, the application may provide an input window 500b through which an input of the device ID of the slave device 200 can be received.

The input window 500b through which an input of the device ID of the slave device 200 can be received may include a device ID input box 520, a list 522 including a plurality of device IDs, and a connect button 524 for commanding communication with the slave device 200 based on the input device ID.

According to an embodiment, the input window 500b through which an input of the device ID of the slave device 200 can be received may be provided when user authentication is performed based on the user authentication information received through the window 500a shown in FIG. 5A through which login input information is received.

The device 100 may receive an input of selecting any one device ID from the list 522 including the plurality of device IDs, through the input window 500b of the application, through which an input of the device ID of the slave device 200 can be received. The device 100 may determine the selected any one device ID as an input to the device ID input box 520.

When an input to the device ID input box 520 is received and an input on the connect button 524 is received, the device 100 may calculate a data transmission rate for data communication with the slave device 200 based on 'ID-0001A', which is a device ID input to the device ID input box 520, and a time period corresponding to a current time by using the application.

Referring to FIG. 5C, according to another embodiment, the application may provide an input window 500c through which an input of the device ID of the slave device 200 can be received based on a serial number (S/N) of the slave device 200.

The input window 500c through which an input of the device ID of the slave device 200 can be received may include an S/N input box 532, an Enter button 534 for determining a value input to the S/N input box 532 as an S/N, a device ID input box 536, and a connect button 538 for commanding communication with the slave device 200 based on a device ID input to the device ID input box 536.

According to an embodiment, the input window 500c through which an input of the device ID of the slave device 200 can be received may be provided when user authentication is performed based on the user authentication information received through the window 500a shown in FIG. 5A through which login input information is received.

The device 100 may receive an input of an S/N of the slave device 200 through the input window 500c of the application, through which an input of the device ID of the slave device 200 can be received When an input of an S/N of the slave device 200 to the S/N input box 532 is received and an input on the Enter button 534 is received, the device 100 may determine the device ID of the slave device 200 based on 'S1234567890*' input to the S/N input box 532. For example, when a device ID mapped to 'S1234567890*' is 'ID-0001A', the device 100 may determine the device ID of the slave device 200 as 'ID-0001A' by using the application. The device 100 may display the determined device ID of the slave device 200 on the device ID input box 536. When an input on the connect button 538 is received, the device 100 may calculate a data transmission rate of the slave device 200 based on the device ID displayed on the device ID input box 556 and a time period corresponding to a current time, by using the application.

FIGS. 6 and 7 are block diagrams of the device 100 according to an embodiment.

As shown in FIG. 6, according to an embodiment, the device 100 may include a processor 1300, a memory 1700, and a communication module 1500. However, all of the components shown in FIG. 6 are not essential components. The device 100 may be implemented by more or less components than the components shown in FIG. 6.

For example, as shown in FIG. 7, the device 100 according to some embodiments may further include a user input unit 1100, an output unit 1200, a sensor 1400, and an audio/video (A/V) input unit 1600 besides the processor 1300, the memory 1700, and the communication module 1500.

The user input unit 1100 may indicate a means through which the user inputs data for controlling the device 100. For example, the user input unit 1100 may include a keypad, a dome switch, a touch pad (a capacitive overlay touch pad, a resistive overlay touch pad, an infrared (IR) beam touch pad, a surface acoustic wave touch pad, an integral strain gauge touch pad, a piezoelectric touch pad, or the like), a jog wheel, a jog switch, and the like but is not limited thereto.

The user input unit 1100 may receive the user's input of the device ID of the slave device 200.

In addition, the user input unit 1100 may receive the user's input corresponding to input data for calculating a data transmission rate corresponding to a data transmission rate of the slave device 200, based on an application.

In addition, the user input unit 1100 may receive an input of user authentication information for calculating a data transmission rate for data communication with the slave device 200.

The output unit 1200 may output an audio signal, a video signal, or a vibration signal and may include a display 1210, an acoustic output unit 1220, and a vibration motor 1230.

The display 1210 displays information processed by the device 100. For example, the display 1210 may display a window provided by the application. In addition, the display 1210 may display state information of the slave device 200, which is acquired through communication with the slave device 200.

When the display 1210 and a touch pad form a layer structure to configure a touchscreen, the display 1210 may be used as not only an output device but also an input device. The display 1210 may include at least one of a liquid crystal display, a thin-film transistor liquid crystal display, an organic light-emitting diode display, a flexible display, a three-dimensional (3D) display, or an electrophoretic display. In addition, the device 100 may include two or more displays 1210 according to implementation forms of the device 100. In this case, the two or more displays 1210 may be arranged to face each other by using a hinge.

The acoustic output unit 1220 may output audio data received through the communication unit 1500 or stored in the memory 1700. In addition, the acoustic output unit 1220 may output an acoustic signal related to a function (e.g., a call signal reception sound, a message reception sound, or an alarm sound) performed by the device 100. The acoustic output unit 1220 may include a speaker, a buzzer, and the like.

The vibration motor 1230 may output a vibration signal. For example, the vibration motor 1230 may output a vibration signal corresponding to an output of audio data or video data (e.g., a call signal reception sound, a message reception sound, or the like). In addition, the vibration motor 1230 may output a vibration signal when a touch is input through the touchscreen.

The processor 1300 may commonly control a general operation of the device 100. For example, the processor 1300 may generally control the user input unit 1100, the output unit 1200, the sensor 1400, the communication module 1500, the A/V input unit 1600, and the like by executing programs stored in the memory 1700. The processor may include at least one processor.

In detail, the processor 1300 acquires the device ID of the slave device 200. The processor 1300 acquires a first data transmission rate for data communication with the slave device 200 based on the acquired device ID of the slave device 200 and a first time period corresponding to a current time. The processor 1300 performs data communication with the slave device 200 based on the acquired first data transmission rate. The first data transmission rate acquired by the processor 1300 may be the same as a first data transmission rate calculated by the slave device 200.

According to an embodiment, the processor 1300 may request a first data transmission rate corresponding to the first data transmission rate of the slave device 200 from the server 300 for managing criterion information about a criterion of calculating a data transmission rate of the slave device 200. The processor 1300 may provide the acquired device ID of the slave device 200 to the server 300 to receive the first data transmission rate from the server 300. The processor 1300 may receive, from the server 300, the first data transmission rate, which is the same as the first data transmission rate of the slave device 200.

Alternatively, according to another embodiment, the processor 1300 may request an application for calculating a data transmission rate for data communication with the slave device 200, from the server 300 for managing the criterion information about a criterion of calculating a data transmission rate of the slave device 200. The processor 1300 may receive, from the server 300, the application for calculating a data transmission rate for data communication with the slave device 200.

The processor 1300 may receive, from the user, user authentication information for calculating a data transmission rate for data communication with the slave device 200, by using the received application. The processor 1300 may perform user authentication based on the received user authentication information by using the application.

The processor 1300 may calculate a first data transmission rate for data communication with the slave device 200 based on the device ID of the slave device 200 and a first time period corresponding to a current time by using the application. The processor 1300 may calculate the first data transmission rate based on the criterion information about a criterion of calculating a data transmission rate of the slave device 200, by using the received application.

According to an embodiment, the processor 1300 may acquire a second data transmission rate for communication with the slave device 200 based on the device ID of the slave device 200 and a second time period corresponding to a current time after a predetermined time interval The second data transmission rate may differ from the first data transmission rate.

The sensor 1400 may detect a state of the device 100 or an ambient state of the device 100 and transmit the detected information to the control unit 1300.

The sensor 1400 may include at least one of a geomagnetic sensor 1410, an acceleration sensor 1420, a temperature/humidity sensor 1430, an IR sensor 1440, a gyroscope sensor 1450, a position sensor (e.g., global positioning system (GPS)) 1460, an atmospheric pressure sensor 1470, a proximity sensor 1480, or an RGB (illuminance) sensor 1490 but is not limited thereto. A function of each sensor may be intuitively inferred by those of ordinary skill in the art from a name thereof, and thus a detailed description thereof is omitted herein.

The communication module 1500 may include at least one component for communicating between the device 100 and the slave device 200 or the server 300. For example, the communication module 1500 may include a short-range wireless communication unit 1510, a mobile communication unit 1520, and a broadcast reception unit 1530.

The short-range wireless communication unit 1510 may include a Bluetooth communication unit, a Bluetooth low energy (BLE) communication unit, a near-field communication unit, a wireless local area network (WLAN) (Wi-Fi) communication unit, a ZigBee communication unit, an IrDA communication unit, a WFD communication unit, a UWB communication unit, an Ant+ communication unit, and the like but is not limited thereto.

The mobile communication unit 1520 transmits and receives a wireless signal to and from at least one of a base station, an external terminal, and a server in a mobile communication network. Herein the wireless signal may include a voice call signal, a video call signal, or various types of data according to text/multimedia message transmission and reception.

The broadcast reception unit 1530 receives a broadcast signal and/or broadcast related information from the outside through a broadcast channel. The broadcast channel may include a satellite channel and a terrestrial channel. According to implementation examples, the device 100 may not include the broadcast reception unit 1530.

In addition, the communication module 1500 may transmit and receive, to and from the slave device 200, the server 300, and peripheral devices, information needed to acquire a data transmission rate corresponding to a data transmission rate of the slave device 200.

The A/V input unit 1600 is to input an audio signal or a video signal and may include a camera 1610, a microphone 1620, and the like. The camera 1610 may obtain an image frame of a still image, a moving picture, or the like through an image sensor in a video call mode or a capturing mode. An image captured through the image sensor may be processed by the control unit 1300 or a separate image processor (not shown).

The image frame processed by the camera 1610 may be stored in the memory 1700 or transmitted to the outside through the communication module 1500. Two or more cameras may be provided according to a configuration aspect of a terminal.

The microphone 1620 receives an external acoustic signal and processes the external acoustic signal into electrical voice data. For example, the microphone 1620 may receive an acoustic signal from an external device or the user. The microphone 1620 may use various noise cancellation algorithms for cancelling noise generated in a process of receiving an external acoustic signal.

The memory 1700 may store programs and instructions for processing and control of the processor 1300 and store data input to the device 100 or output from the device 100.

The memory 1700 may include at least one type of storage medium among a flash memory type memory, a hard disk type memory, a multimedia card micro type memory, a card type memory (e.g., a secure digital (SD) or extreme digital (XD) memory), random access memory (RAM), static RAM (SRAM), read only memory (ROM), electrically erasable programmable ROM (EEPROM), PROM, a magnetic memory, a magnetic disc, and an optical disc.

The programs stored in the memory 1700 may be classified into a plurality of modules according to functions thereof, e.g., a user interface (UI) module 1710, a touchscreen module 1720, an alarm module 1730, and the like.

The UI module 1710 may provide a specified UI, a specified graphics UI (GUI), or the like interoperating with the device 100 for each application. The touchscreen module 1720 may sense a touch gesture of the user on the touchscreen and transmit information regarding the touch gesture to the control unit 1300. According to some embodiments, the touchscreen module 1720 may determine and analyze a touch code. The touchscreen module 1720 may be configured by separate hardware including a controller.

Various sensors may be provided inside or around the touchscreen to sense a touch or a proximity touch on the touchscreen. One example of the sensors configured to sense a touch on the touchscreen is a tactile sensor. The tactile sensor indicates a sensor configured to sense a touch of a certain object in a level which a human being feels or more. The tactile sensor may sense various pieces of information such as roughness of a contact surface, hardness of a contact object, and a temperature of a contact point.

In addition, one example of the sensors configured to sense a touch on the touchscreen is a proximity sensor.

The proximity sensor is a sensor configured to detect the presence/absence of an object approaching a predetermined detection surface or an object existing around the proximity sensor, without mechanical contact by using a force of an electromagnetic field or IR rays. Examples of the proximity sensor are a transmissive photoelectric sensor, a direct reflective photoelectric sensor, a mirror reflective photoelectric sensor, a radio frequency oscillation proximity sensor, a capacitive proximity sensor, a magnetic proximity sensor, an infrared proximity sensor, and the like. The touch gesture of the user may include tap, touch & hold, double tap, drag, panning, flick, drag & drop, swipe, and the like.

The alarm module 1730 may generate a signal for informing of the occurrence of an event of the device 100. Examples of the event occurring in the device 100 may include call signal reception, message reception, key signal input, schedule notification, and the like. The alarm module 1730 may output an alarm signal in a video signal form through the display 1210, an audio signal form through the acoustic output unit 1220, or a vibration signal form through the vibration motor 1230.

The embodiments described above may be edited as a computer-executable program and implemented in a general-use digital computer for operating the program by using a computer-readable medium. In addition, a structure of data used in the embodiments described above may be recorded on a computer-readable medium through various means In addition, the embodiments described above may be implemented in a form of a recording medium including computer-executable instructions such as a program module executed by a computer system. For example, methods implemented with a software module or an algorithm may be stored in a computer-readable recording medium in the form of computer-readable and executable codes or program instructions.

The computer-readable medium may be an arbitrary recording medium which may be accessed by a computer system and includes volatile and non-volatile media and separated and non-separated media. The computer-readable medium may include, for example, magnetic storage media (e.g., ROM, RAM, floppy disks, hard disks, etc.) and optical recording media (e.g., CD-ROMs, digital versatile discs (DVDs), etc.) but is not limited thereto. In addition, the computer-readable medium may include a computer storage medium and a communication medium.

A plurality of computer-readable recording media can be distributed over network coupled computer systems, and data, e.g., program instructions and code, stored in the distributed recording media may be executed by at least one computer system.

The invention claimed is:

1. A device for communicating with a slave device, the device comprising:
    a communication module;
    a memory; and
    at least one processor configured to control the communication module and the memory,
    wherein the memory stores instructions which, when executed, configure the at least one processor to acquire a device identifier (ID) of the slave device, acquire a first data transmission rate for data communication with the slave device based on the acquired device ID and a first time period corresponding to a first current time, communicate with the slave device based on the acquired first data transmission rate, acquire a second data transmission rate, which is different from the first data transmission rate, based on the acquired device ID and a second time period corresponding to a second current time, after a predetermined time interval, and communicate with the slave device based on the second data transmission rate,
    wherein the first data transmission rate and the second data transmission rate acquired by the processor are substantially the same as a first data transmission rate and a second data transmission rate calculated by the slave device based on the first time period.

2. The device of claim 1, wherein the instructions, when executed, further configure the at least one processor to request the first data transmission rate from a server for managing criterion information about a criterion of calculating the first data transmission rate and receive the first data transmission rate from the server.

3. The device of claim 2, wherein the criterion information includes information about a time period corresponding to a current time and information about a time interval at which the data transmission rate is changed.

4. The device of claim 1, wherein the instructions, when executed, further configure the at least one processor to:
    request an application for calculating a data transmission rate from a server for managing criterion information about a criterion of calculating the data transmission rate,
    receive the application for calculating the data transmission rate from the server, and
    calculate the first data transmission rate and the second data transmission rate by using the received application.

5. The device of claim 4, wherein the application calculates the first data transmission rate and the second data transmission rate based on the criterion information.

6. The device of claim 4, wherein the device further comprises a user input module configured to receive user authentication information, and
    the instructions, when executed, further configure the at least one processor to receive the user authentication information through the application and perform user authentication for calculating the data transmission rate based on the received user authentication information.

7. A method, performed by a device, of communicating with a slave device, the method comprising:
    acquiring a device identifier (ID) of the slave device;
    acquiring a first data transmission rate for data communication with the slave device based on the acquired device ID and a first time period corresponding to a first current time;
    communicating with the slave device based on the acquired first data transmission rate;
    acquiring a second data transmission rate, which is different from the first data transmission rate, based on the acquired device ID and a second time period corresponding to a second current time, after a predetermined time interval; and
    communicating with the slave device based on the second data transmission rate,
    wherein the acquired first data transmission rate and the acquired second data transmission rate are substantially the same as a first data transmission rate and a second data transmission rate calculated by the slave device based on the first time period.

8. The method of claim 7, wherein the acquiring of the first data transmission rate comprises:
    requesting the first data transmission rate from a server for managing criterion information about a criterion of calculating the first data transmission rate; and
    receiving the first data transmission rate from the server.

9. The method of claim 8, wherein the criterion information includes information about a time period corresponding to a current time and information about a time interval at which the data transmission rate is changed.

10. The method of claim 7, further comprising:
    requesting an application for calculating a data transmission rate from a server for managing criterion information about a criterion of calculating the data transmission rate;
    receiving the application from the server; and
    calculating the first data transmission rate and the second data transmission rate by using the received application.

11. The method of claim 10, wherein the application calculates the first data transmission rate and the second data transmission rate based on the criterion information.

12. The method of claim 10, further comprising:
    receiving an input of user authentication information through the application; and
    performing user authentication for calculating the data transmission rate based on the input user authentication information.

13. A computer program product comprising a non-transitory recording medium having a program stored therein, the program for:
- acquiring a device identifier (ID) of a slave device;
- acquiring a first data transmission rate for data communication with the slave device based on the acquired device ID and a first time period corresponding to a first current time;
- communicating with the slave device based on the acquired first data transmission rate;
- acquiring a second data transmission rate, which is different from the first data transmission rate, based on the acquired device ID and a second time period corresponding to a second current time, after a predetermined time interval; and
- communicating with the slave device based on the second data transmission rate,
- wherein the acquired first data transmission rate and the acquired second data transmission rate are substantially the same as a first data transmission rate and a second data transmission rate calculated by the slave device based on the first time period.

* * * * *